(12) United States Patent
Suyama

(10) Patent No.: US 6,443,487 B1
(45) Date of Patent: Sep. 3, 2002

(54) PASSENGER PROTECTING APPARATUS

(75) Inventor: Yoji Suyama, Tokyo (JP)

(73) Assignee: Takata Corporation, Tokyo (JP)

( * ) Notice: Subject to any disclaimer, the term of this patent is extended or adjusted under 35 U.S.C. 154(b) by 0 days.

(21) Appl. No.: 09/702,057

(22) Filed: Oct. 31, 2000

(30) Foreign Application Priority Data

Nov. 1, 1999 (JP) .......................................... 11-311210

(51) Int. Cl.$^7$ ............................................... B60R 21/18
(52) U.S. Cl. .................................................... 280/733
(58) Field of Search ............................ 280/733, 801.1, 280/802, 803; 297/468, 469

(56) References Cited

U.S. PATENT DOCUMENTS 3,279,851 A * 10/1966 Hinchcliff ................... 297/481
4,445,722 A * 5/1984 Schaper ....................... 297/468
5,064,220 A * 11/1991 Ogawa ......................... 280/801
5,332,261 A * 7/1994 Siepierski ................. 280/801.1
5,597,178 A * 1/1997 Hardin, Jr. .................. 280/733

* cited by examiner

Primary Examiner—Brian L. Johnson
Assistant Examiner—Faye M. Fleming
(74) Attorney, Agent, or Firm—Foley & Lardner

(57) ABSTRACT

A passenger protecting apparatus for improving the comfort of an air belt and for facilitating the attachment and release of the air belt's tongue and buckle connection. The apparatus includes a buckle having a buckle housing connected to a seat base via an anchor member and a bolt so as to allow the buckle housing to be rotated towards the front and back of the vehicle. The anchor member is provided with a spindle insertion portion formed in the state of a hole on the upper end portion thereof. The anchor member and the buckle housing are connected via a spindle pin inserted into the spindle inserting portion. Since the spindle pin is oriented to permit the buckle to rotate towards the sides of the vehicle body.

13 Claims, 3 Drawing Sheets

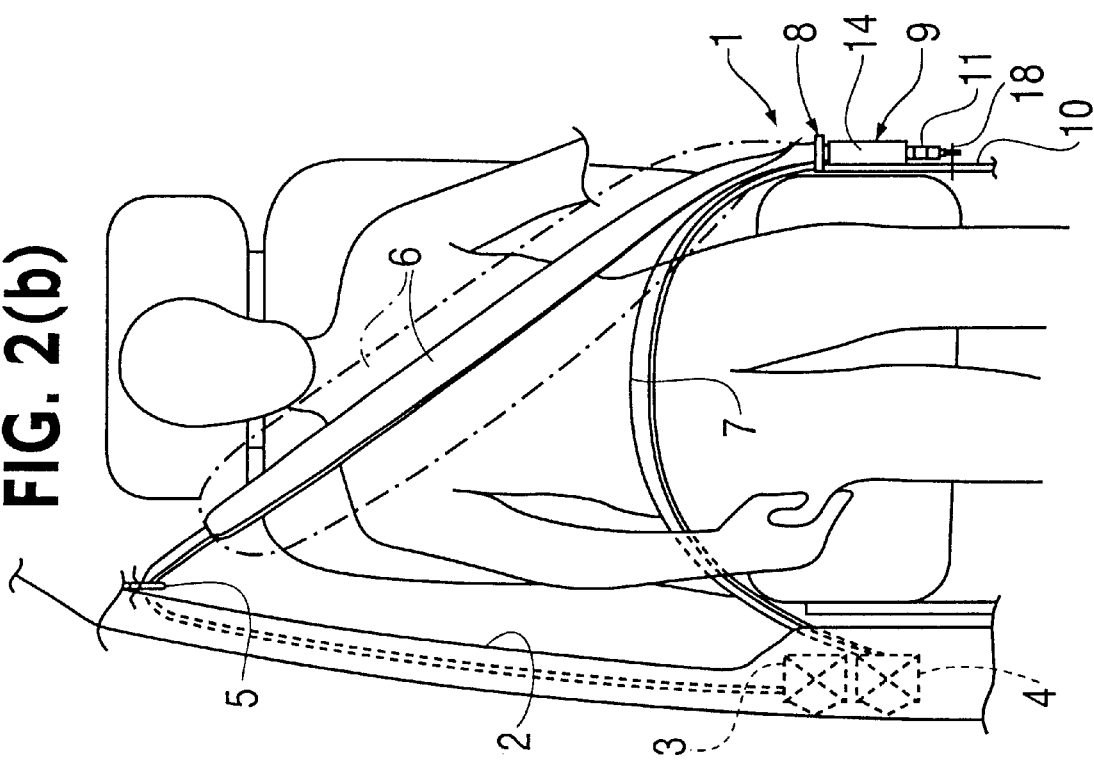
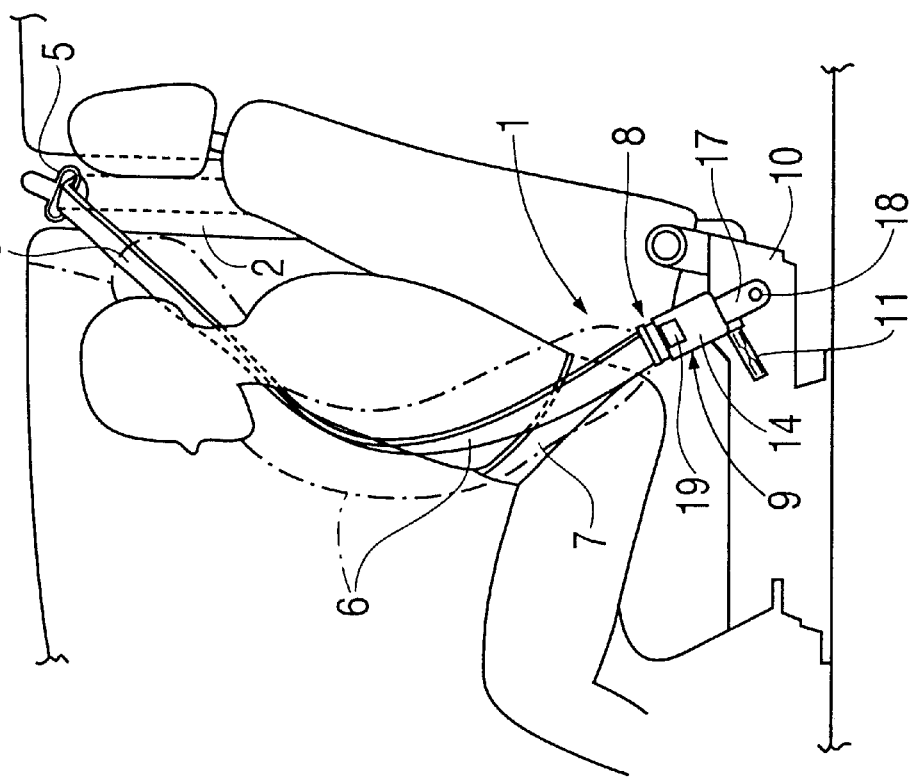

PASSENGER PROTECTING APPARATUS

BACKGROUND OF THE INVENTION

The present invention relates to a passenger protecting apparatus for protecting passengers in a vehicle in case of collision or the like. More particularly, the invention relates to a passenger protecting apparatus having an air belt that is inflated by gas.

Referring now to FIG. 2, an air belt device of this type in the related art will be described. The air belt device 1 comprises a shoulder belt retractor 3 provided in the lower part of the center pillar 2, a lap belt refractor 4 located below the shoulder belt retractor 3, a shoulder belt 6 pulled out from the shoulder belt retractor 3 and extending via a slip guide 5 provided on the upper part of the center pillar 2, a lap belt 7 pulled out from the lap belt retractor 4, a tongue device 8 fixed at the ends of the shoulder belt 6 and the lap belt 7, a buckle device 9 fixed to the seat base 10 formed of a seat frame or a slide rail for receiving said tongue device 8, and an air belt inflator 11 formed integrally with the buckle device 9.

The shoulder belt retractor 3 and the lap belt retractor 4 unwind and retract the shoulder belt 6 and the lap belt 7 respectively, and are constructed in such a manner that the belts 6 and 7 are able to be unwound so that the passenger is able to move freely in the normal state, and the belts 6 and 7 are locked so as not to be unwound to restrain the passenger in case of collision of the vehicle. The air belt inflator 11 ignites in response to the ignition command supplied by the ignition control unit 7 and generates high pressure gas.

The lap belt 7 is formed of a conventional plain weave belt of synthetic fiber. The portion of the shoulder belt 6 that comes in contact with the breast of the passenger comprises an inflatable bag and a cover covering the outside thereof. The cover stretches easily in the radial direction but not along the length thereof. The bag and the cover are formed in a flat belt in the normal state, and when high pressure gas is supplied to the bag from the air belt inflator 11, the bag is inflated to the state shown by a dotted line and restrains the passenger softly.

The air belt inflator 11 is fixed in the lower portion of the buckle housing 14 that constitutes the body of the buckle device 9. An anchor member 17 that is fixed to the buckle housing 14 at an upper end thereof. The anchor member 17 is supported on the seat base 10 via a pivot pin 18 so as to swing back and forth toward the front and read of the vehicle.

The catching hole (not shown) opening on the upper wall of the buckle housing 14 and the air belt inflator 11 are in communication with respect to each other via a gas passage formed within the buckle housing 14. When the tongue of the tongue device 8 is inserted into the buckle housing 14 to connect the tongue device 8 and the buckle device 9, the catching hole formed on the upper wall of the buckle housing 14 is brought into communication with the gas receiving portion on the front end of the tongue device 8. The gas receiving portion is in communication with the inside of the bag.

A release button 19 for separating the tongue device 8 from the buckle device 9 is provided on the buckle housing 14.

When the automotive vehicle equipped with the passenger protecting apparatus collides with an object or rolls over beyond a prescribed amount, the air belt inflator 11 generates gas, which is supplied into the inflatable bag in the shoulder belt 6 through the buckle device 9 and the tongue device 8 to inflate the bag. Thus, the portion of the shoulder belt 6 laid over the upper half of the passenger's body is inflated. Consequently, the impact applied to the passenger is absorbed.

In the buckle device 9 of the conventional passenger protecting apparatus described above, the anchor member 17 is mounted to the seat base 10 by the pivot pin 18 so as to swing back and forth. When the passenger's body moves backward and forward on the seat the buckle device 9 rotates accordingly, thereby alleviating the passenger's feeling of being pressurized by the shoulder belt 6.

From a study of various aspects of the technology, it has been determined that allowing the buckle device to rotate in the direction of the width of the vehicle body (i.e. toward the sides of the vehicle) further reduces the passenger's feeling of being pressurized by the shoulder belt.

SUMMARY OF THE INVENTION

The passenger protecting apparatus of the present invention comprises an air belt to be inflated by an injection of gas, a tongue provided at one end of said air belt, a buckle for receiving said tongue, and an anchor member including an upper portion to which said buckle is attached and a lower portion to be connected to the vehicle body, wherein said anchor member includes a rotating portion for rotating said buckle in the direction of the width of the vehicle body. The passenger protecting apparatus of the present invention may comprise means for urging said buckle to the upright position.

It is to be understood that both the foregoing general description and the following detailed description are exemplary and explanatory only, and are not restrictive of the invention as claimed.

BRIEF DESCRIPTION OF THE DRAWINGS

These and other features, as aspects, and advantages of the present invention will become apparent from the following description, appended claims, and the accompanying exemplary embodiments shown in the drawings, which are briefly described below.

FIG. 1(*b*) is a side view of the buckle device of FIG. 1(*a*);

FIG. 1(*c*) is an enlarged crossectional side view of a rotating joint between a buckle housing and an anchor member of the buckle device of FIG. 1(*a*);

FIG. 2(*a*) is a side view of a passenger protecting apparatus of the related art;

FIG. 2(*b*) is a front view of the passenger protecting apparatus of FIG. 2(*a*);

DETAILED DESCRIPTION OF THE PREFERRED EMBODIMENTS

Figure 1C:
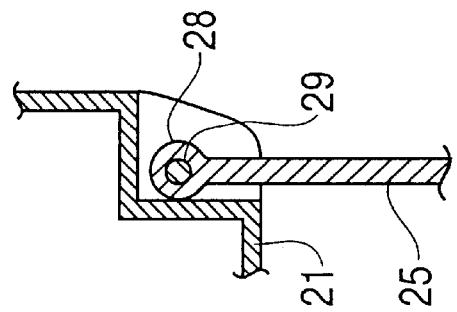
FIG. 1(*a*) is a front view of a buckle device for a passenger protecting apparatus according to the present invention.
Figure 1B:
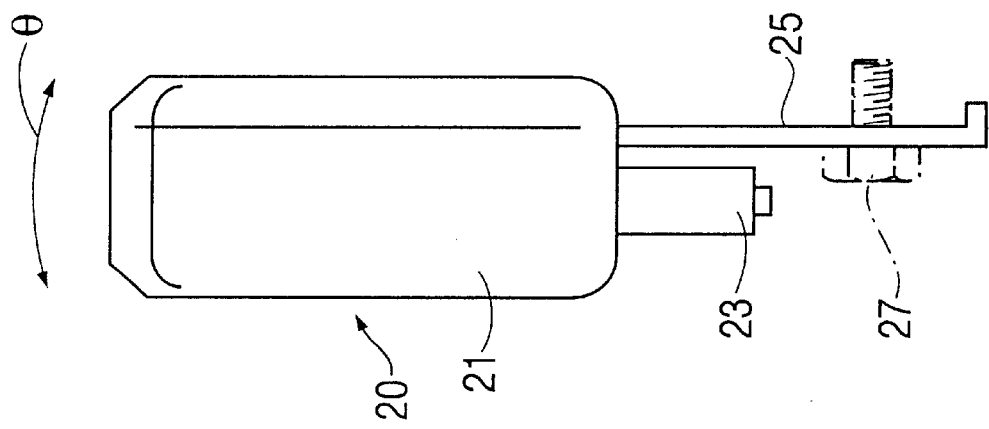
Figure 1A:
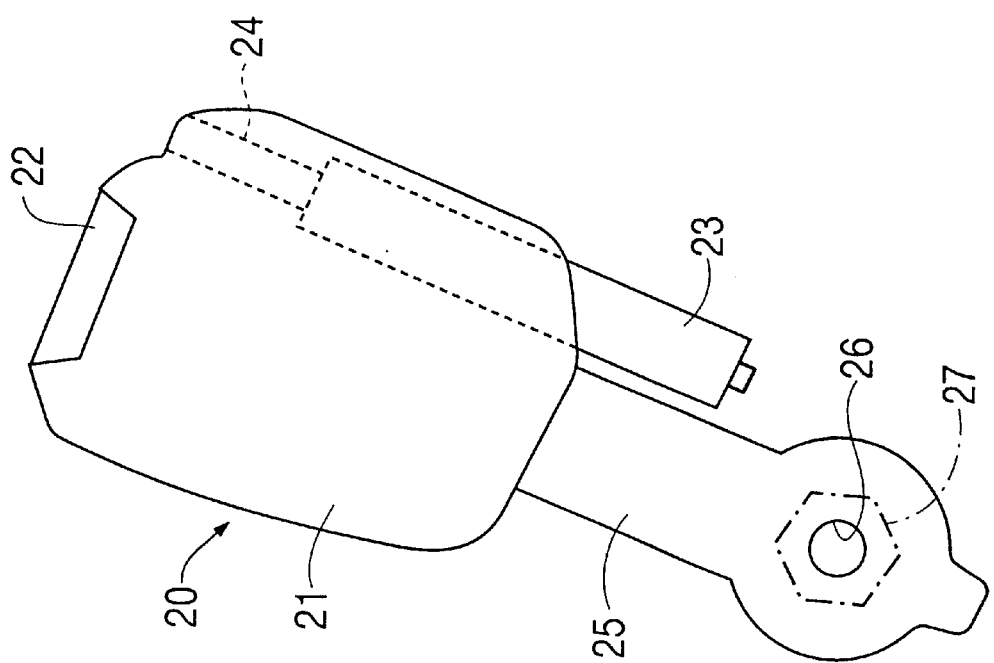

FIG. 1 discloses a buckle device of the passenger protecting apparatus according to an embodiment of the present invention. A buckle device 20 is provided that includes a latch mechanism of the tongue (not shown) in the buckle housing 21, and a release button 22 that may be pressed to release the latch of the latching mechanism on the upper portion of the housing 21. The upper surface of the buckle housing 21 is formed with a tongue insertion hole and a gas injection hole. The inflator 23 fixedly mounted in the buckle housing 21 is disposed so that generated gas is led through the duct 24 to said injection hole.

The buckle housing 21 is connected to the seat base (not shown) via an anchor member 25 and a bolt 27 so as to swing back and forth towards the front and back of the vehicle. The anchor member 25 is provided with an insertion hole 26 on the lower portion thereof for inserting the bolt 27.

The end of upper portion of the anchor member 25 is provided with a spindle insertion portion 28 in the form of a hole. The anchor member 25 and the buckle housing 21 are connected by a spindle pin 29 inserted into said spindle insertion portion or hole 28. The spindle pin 29 is oriented in the long direction of the vehicle body. Thus, the buckle device 20 is rotatable in the width direction of the vehicle body (i.e. toward the sides of the vehicle) as shown by an arrow θ in FIG. 1(b).

Therefore, after the tongue of the air belt is inserted into and engaged with the buckle device 20, the buckle device 20 may rotate towards the front and back, and right and left sides of the vehicle in accordance with the movement of the body of the passenger wearing the air belt. As a result, the passenger's feeling of being pressurized by the air belt is alleviated.

In addition, the buckle 20 may be oriented in any direction in which it can be handled easily by the passenger when he or she wants to insert the tongue into the buckle device 20 or to press the release button 22. As a result, the attachment and detachment of the tongue is facilitated.

A spring may be provided for pressing and directing the buckle device 20 to the prescribed directions around the spindle pin 29 or around the bolt 27.

Though, in the embodiment described so far, the spindle pin 29 is provided at the joint between the anchor member 25 and the buckle housing 21, it is also possible to provide a rotable hinge at the vertical midsection of the anchor member 25.

In the present invention, means for urging the buckle housing 21 in the upright position may be provided around the spindle pin 29 for maintaining the buckle device 20 in the upright position in the normal state (when the tongue is not attached). An example of a buckle with this feature is shown in FIG. 3.

Figure 3:
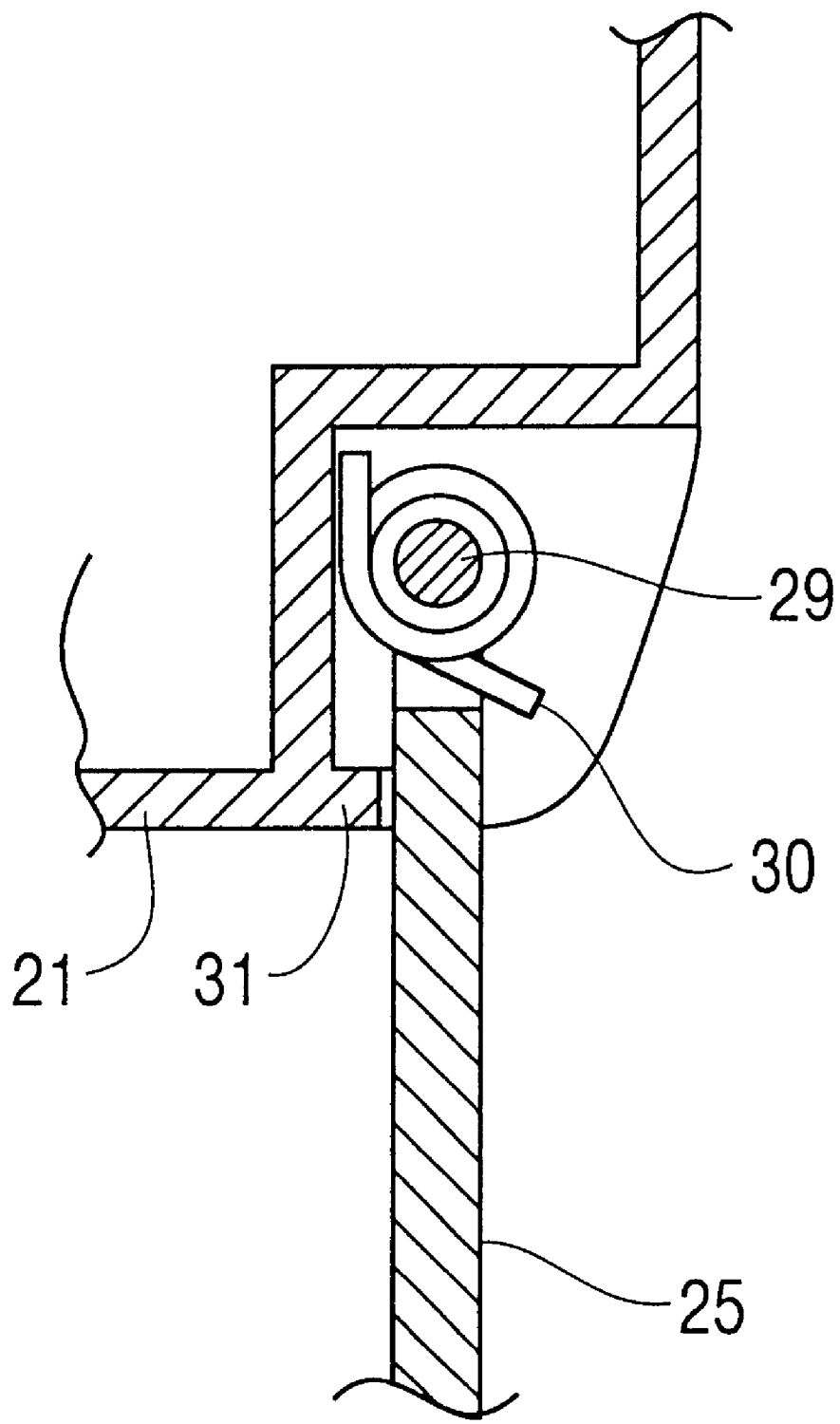
FIG. 3 is an enlarged crossectional side view of a rotating joint between a buckle housing and an anchor member according to an alternative embodiment of the present invention.

As shown in FIG. 3, a tension spring 30 formed of a coil spring is mounted around the spindle pin 29. One end of the tension spring 30 is engaged with the anchor member 25 and the other end abuts against the buckle housing 21.

A stopper 31 projecting on the lower portion of the buckle housing 21 is provided for preventing the buckle device 20 from moving away from the seat due to the biasing force of the tension spring 30. The rotation of the buckle housing 21 is limited by abutment between the stopper 31 and the anchor member 25. Therefore, the buckle housing 21 cannot rotate counterclockwise from the state shown in FIG. 3, but is rotatable clockwise only.

As is described thus far, since the passenger protecting apparatus of the present invention is constructed in such a manner that the buckle device is rotatable in the directions of the width of the vehicle body, the wearing comfort of the air belt is quite good and the attaching and releasing operation of the tongue is facilitated.

The priority document JP H11-311210, filed Nov. 1, 1999, is incorporated by reference herein.

I claim:

1. A passenger protecting apparatus comprising:
   an air belt to be inflated by an injection of gas;
   a tongue provided at one end of said air belt;
   a buckle for receiving said tongue; and
   an anchor member having an upper portion connected to said buckle and a lower portion configured to be connected to a vehicle body;
   wherein said anchor member is configured to allow the buckle to pivot toward the sides of the vehicle body; and
   wherein said upper portion is pivotally connected to said buckle.

2. The passenger protecting apparatus of claim 1, wherein the upper portion of the anchor member is attached to the buckle by a spindle pin.

3. The passenger protecting apparatus of claim 1, wherein said lower portion is pivotally connected to said vehicle body.

4. The passenger protecting apparatus of claim 3, wherein said upper and lower portions are rigidly connected.

5. The passenger protecting apparatus of claim 4, wherein said upper and lower portions are integrally connected.

6. The passenger protecting apparatus of claim 3, wherein an axis about which the buckle pivots relative to the upper portion is generally perpendicular to an axis about which the lower portion pivots relative to the vehicle.

7. A passenger protecting apparatus comprising:
   an air belt to be inflated by an injection of gas;
   a tongue provided at one end of said air belt;
   a buckle for receiving said tongue; and
   an anchor member having an upper portion connected to said buckle and a lower portion configured to be connected to a vehicle body;
   wherein said anchor member is configured to allow the buckle to pivot toward the sides of the vehicle body; and
   a mechanical stop to limit the range of pivoting motion of the buckle.

8. A passenger protecting apparatus comprising:
   an inflatable air belt;
   a tongue provided at one end of said air belt for connecting the air belt to a buckle;
   an anchor member having an upper portion connected to said buckle and a lower portion configured to be connected to a vehicle body;
   a mechanism for connecting the anchor member to the buckle so that the buckle may pivot toward the sides of the vehicle body; and
   wherein said upper portion is pivotally connected to said buckle.

9. The passenger protecting apparatus of claim 8, wherein said lower portion is pivotally connected to said vehicle body.

10. The passenger protecting apparatus of claim 9, wherein said upper and lower portions are rigidly connected.

11. The passenger protecting apparatus of claim 10, wherein said upper and lower portions are integrally connected.

12. The passenger protecting apparatus of claim 9, wherein an axis about which the buckle pivots relative to the upper portion is generally perpendicular to an axis about which the lower portion pivots relative to the vehicle.

13. A passenger protecting apparatus comprising:

an inflatable air belt;

a tongue provided at one end of said air belt for connecting the air belt to a buckle;

an anchor member having an upper portion connected to said buckle and a lower portion configured to be connected to a vehicle body;

a mechanism for connecting the anchor member to the buckle so that the buckle may pivot toward the sides of the vehicle body; and wherein the mechanism includes a mechanical stop to limit the range of pivoting motion of the buckle.

\* \* \* \* \*